United States Patent

McCabe et al.

(10) Patent No.: US 9,734,117 B2
(45) Date of Patent: Aug. 15, 2017

(54) DATA STORAGE DEVICE AND METHOD FOR INTEGRATED BRIDGE FIRMWARE TO BE RETRIEVED FROM A STORAGE SYSTEM ON CHIP (SOC)

(71) Applicant: Western Digital Technologies, Inc., Irvine, CA (US)

(72) Inventors: Timothy J. McCabe, Mission Viejo, CA (US); John E. Maroney, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 105 days.

(21) Appl. No.: 14/605,910

(22) Filed: Jan. 26, 2015

(65) Prior Publication Data

US 2016/0217099 A1 Jul. 28, 2016

(51) Int. Cl.
*G06F 13/42* (2006.01)
*G06F 12/02* (2006.01)
*G06F 13/40* (2006.01)

(52) U.S. Cl.
CPC ...... *G06F 13/4234* (2013.01); *G06F 12/0246* (2013.01); *G06F 13/4063* (2013.01); *G06F 2212/7208* (2013.01); *Y02B 60/1228* (2013.01); *Y02B 60/1235* (2013.01)

(58) Field of Classification Search
CPC ............ G06F 13/4234; G06F 12/0246; G06F 13/4063; G06F 2212/7208; G06F 3/123; G06F 8/65; G06F 21/76
See application file for complete search history.

(56) References Cited

U.S. PATENT DOCUMENTS

| | | | |
|---|---|---|---|
| 5,606,660 A * | 2/1997 | Estakhri | G06F 11/1004 714/38.1 |
| 5,819,087 A | 10/1998 | Le et al. | |
| 6,499,054 B1 | 12/2002 | Hesselink et al. | |
| 6,711,059 B2 * | 3/2004 | Sinclair | G06F 9/4403 365/185.11 |
| 6,732,158 B1 | 5/2004 | Hesselink et al. | |
| 6,968,450 B1 * | 11/2005 | Rothberg | G06F 3/0607 711/113 |

(Continued)

OTHER PUBLICATIONS

Shanahan, D. "Tech Bits. On Chip Rom Code used in SOC Designs." EE Times (2001).*

(Continued)

*Primary Examiner* — David X Yi
*Assistant Examiner* — Francisco Grullon (57) ABSTRACT

A data storage device may comprise a first non-volatile memory, configured to store storage System-On-Chip (SOC) data and protocol bridge data; a storage SOC comprising circuitry configured to control the data storage device and to, upon power-on, retrieve the storage SOC data from the first non-volatile memory and configure itself according to the retrieved storage SOC data; a bus coupled to the storage SOC; and a protocol bridge coupled to the bus and comprising circuitry configured to translate between a first and a second communication protocol and to, upon power-on, retrieve the protocol bridge data from the first non-volatile memory via the storage SOC and the bus and configure itself according to the retrieved protocol bridge data.

15 Claims, 4 Drawing Sheets

(56) References Cited

U.S. PATENT DOCUMENTS

| | | | |
|---|---|---|---|
| 7,028,174 B1* | 4/2006 | Atai-Azimi | G06F 21/14 |
| | | | 713/1 |
| 7,120,692 B2 | 10/2006 | Hesselink et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,788,404 B2 | 8/2010 | Hesselink et al. | |
| 7,917,628 B2 | 3/2011 | Hesselink et al. | |
| 7,934,251 B2 | 4/2011 | Hesselink et al. | |
| 7,949,564 B1 | 5/2011 | Hughes et al. | |
| 8,004,791 B2 | 8/2011 | Szeremeta et al. | |
| 8,255,661 B2 | 8/2012 | Karr et al. | |
| 8,285,965 B2 | 10/2012 | Karr et al. | |
| 8,301,822 B2 | 10/2012 | Pinto et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 8,819,443 B2 | 8/2014 | Lin | |
| 8,909,889 B1* | 12/2014 | Ong | G06F 3/0601 |
| | | | 360/73.01 |
| 2005/0060478 A1* | 3/2005 | Wu | G06F 13/4027 |
| | | | 710/306 |
| 2005/0144195 A1 | 6/2005 | Hesselink et al. | |
| 2005/0144200 A1 | 6/2005 | Hesselink et al. | |
| 2005/0251617 A1* | 11/2005 | Sinclair | G06F 3/061 |
| | | | 711/103 |
| 2007/0088940 A1* | 4/2007 | Conley | G06F 9/445 |
| | | | 713/1 |
| 2007/0260914 A1* | 11/2007 | Pogrebinsky | G06F 11/0745 |
| | | | 714/5.11 |
| 2010/0070693 A1* | 3/2010 | Conley | G06F 9/445 |
| | | | 711/103 |
| 2011/0072185 A1 | 3/2011 | Pinto et al. | |
| 2011/0154023 A1* | 6/2011 | Smith | G06F 21/78 |
| | | | 713/155 |
| 2012/0036041 A1 | 2/2012 | Hesselink | |
| 2012/0166828 A1* | 6/2012 | Maroney | G06F 1/3268 |
| | | | 713/320 |
| 2013/0212401 A1 | 8/2013 | Lin | |
| 2013/0259062 A1 | 10/2013 | Henning et al. | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2014/0095439 A1 | 4/2014 | Ram | |
| 2014/0095855 A1 | 4/2014 | Huynh et al. | |
| 2014/0169921 A1 | 6/2014 | Carey | |
| 2014/0173215 A1 | 6/2014 | Lin et al. | |
| 2014/0189197 A1 | 7/2014 | Krithivas et al. | |

OTHER PUBLICATIONS

Arora, Mohit, and Varun Jain. "Understanding embedded-system-boot techniques." EDN-Electronic Design News 56.3 (2011): 18.*

* cited by examiner

DATA STORAGE DEVICE AND METHOD FOR INTEGRATED BRIDGE FIRMWARE TO BE RETRIEVED FROM A STORAGE SYSTEM ON CHIP (SOC)

BACKGROUND

Embodiments are related to data storage devices. In particular, embodiments are related to methods for integrated protocol bridge firmware to be retrieved from a storage System on Chip (SOC), and corresponding methods.

DETAILED DESCRIPTION

A protocol bridge may comprise two parts; namely, a front-end that connects to initiator devices and a back-end that connects to target devices. The back-end may be configured to use a data protocol designed for target devices while the front-end may be configured to use a protocol designed for initiator devices. The front-end and back-end need to use the same protocol; rather, each system component may use whatever protocol is best suited to the attached devices. For instance, the front-send could use Fibre Channel over Ethernet (FCoE) or Universal Serial Bus (USB) while the back end could use Serial Attached SCSI (SAS) or Serial ATA (SATA).

Functionally, a bridge controller converts and transports data traffic from one protocol to another so that devices using different protocols may effectively communicate. Data storage devices such as hard disk drives (HDDs) comprising rotary storage media and hybrid disk drives comprising both rotary and solid state storage media may comprise a protocol bridge such as a USB to SATA protocol bridge.

Figure 1A:
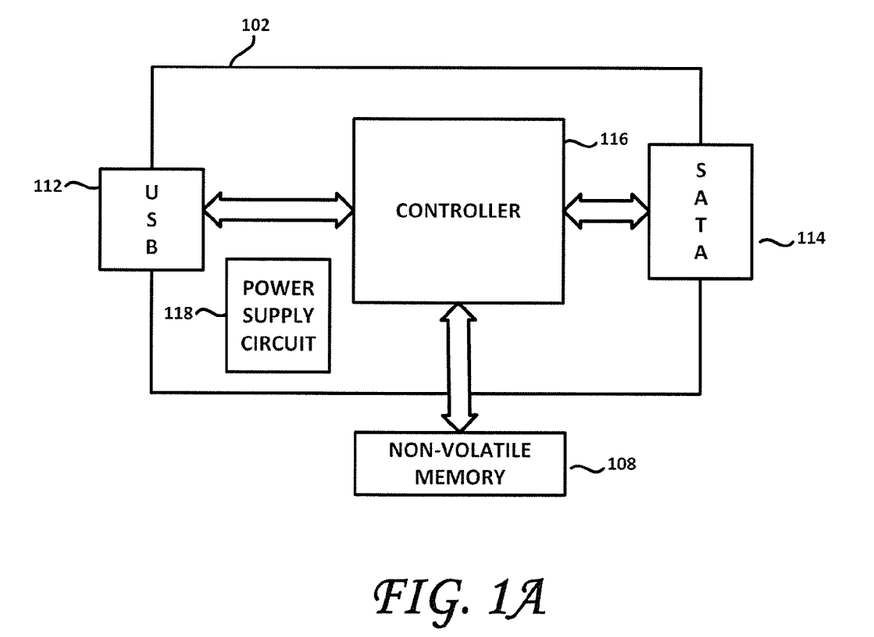
FIG. 1A is a block diagram of a protocol bridge and a storage SOC and ancillary Flash storage.

FIG. 1A is a block diagram of a protocol bridge 102. As shown, the protocol bridge 102 may comprise a controller 116 that may be coupled to a, for example, USB interface 112 and to a, for example, SATA interface 114. A power supply 118 provides regulated power to the protocol bridge 102. The controller 116 is coupled to non-volatile memory 108, for purposes developed hereunder.

Figure 1B:
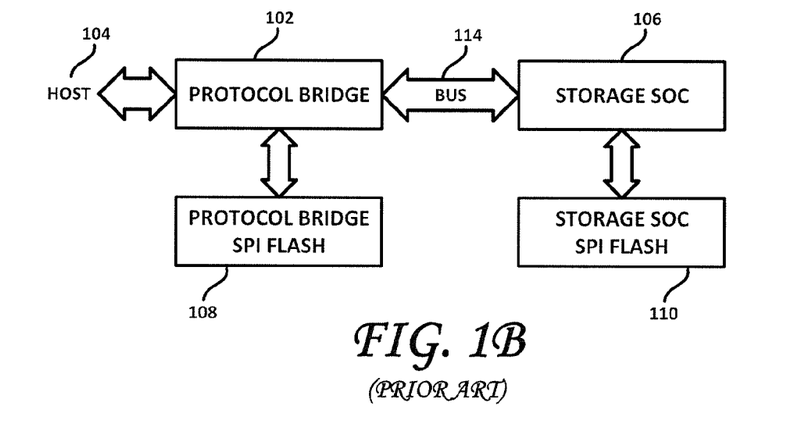
FIG. 1B is a block diagram of a protocol bridge.

FIG. 1B is a block diagram of a protocol bridge and a storage SOC and ancillary Flash storage. As shown therein, a protocol bridge 102 may be configured to couple to a host 104 via, for example, a USB interface. The protocol bridge 102 may also be configured to couple to a storage SOC 106 via a, for example, SATA bus 702. As shown in FIG. 1B, the protocol bridge 102 is coupled to a protocol bridge Serial Peripheral Interface (SPI) Flash memory 108. Similarly, the storage SOC 106 is coupled to a storage SOC SPI Flash memory 110. Upon power up, ROM internal to the protocol bridge is accessed and code stored therein is executed. This code is functionally effective to enable the protocol bridge 102 to access its protocol bridge SPI Flash 108 to retrieve code and data therefrom to enable the protocol bridge 102 to initialize to a fully functional state. Similarly, the storage SOC 106 comprises internal ROM that is also accessed at power up. Code and data stored therein is accessed and used to enable the storage SOC 106 to access the storage SOC SPI Flash 110 and retrieve code and data therefrom. This retrieved code and data enables the storage SOC to initialize to a fully functional state. The protocol bridge 102 and the storage SOC 106 may then enable the bus 114 and implement the SATA protocol thereon. The presence of both SPI Flash memories 108 and 110, one for the protocol bridge 102 and the other for the storage SOC is costly and presents a barrier to further size reductions in the data storage device electronics and to reducing power consumption and heat dissipation.

Figure 2:
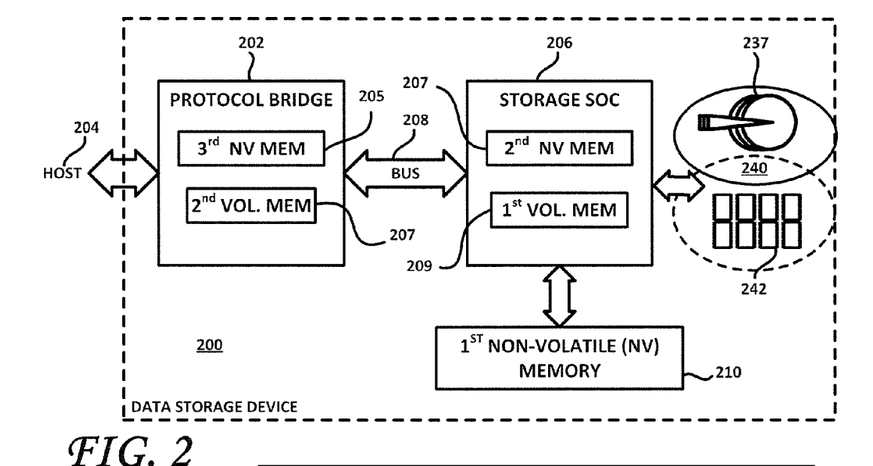
FIG. 2 is a block diagram of a portion of a data storage device, according to one embodiment.

A data storage device 200 and data storage device circuitry according to one embodiment is shown in FIG. 2. As shown therein, the data storage device 200 may comprise a protocol bridge 202, which may be configured to couple to a host 204. The protocol bridge 202 may be configured to translate between a first and a second communication protocol. For example, the first protocol may comprise USB and the second protocol may comprise SATA. Note, however, that although USB and SATA are used for exemplary purposes, there is no "preferred" protocol for either the first or the second protocols. Thus, the protocol bridge 202 may be configured to translate between other protocols, as called for by the particular implementation. A storage SOC 206 may be coupled to the protocol bridge 202 over a bus 208. The bus 208 may conform to, for example, the SATA protocol. Other protocols may be implemented by bus 208. The storage SOC 206 may be configured to control the data storage device 200 and may comprise, without limitation, circuitry configured as a read channel, hard disk controller, microprocessor, Error Correction Code (ECC), high-speed interface I/O, and system memory functions, all disposed on a single piece of silicon.

A first non-volatile memory 210 may be coupled to the storage SOC 206. For example, the first non-volatile memory 210 may comprise Flash memory and may be configured to store storage SOC data including, for example, storage SOC code, storage SOC configuration and other data. The data storage device 200 further may comprise one or more hard disk drives (HDDs) each comprising one or more spinning magnetic disks, as shown at 237. The data storage 200 may alternatively comprise non-volatile (e.g., Flash-based) memories 242. Alternatively still, the data storage 200 may comprise one or more hybrid storage devices, each comprising both magnetic disks 237 and non-volatile semiconductor memory 242, as suggested at 240. The data storage 200 may also comprise one or more network interfaces, enabling the data storage 200 to communicate with a network and/or other external devices through communication ports.

According to one embodiment, the first non-volatile memory ("non-volatile memory", at times, being abbreviated as "NV MEM" in FIG. 2) may also be configured to store protocol bridge data including, for example, protocol bridge code, protocol bridge configuration and other data. In one embodiment, the storage SOC data may be stored beginning at a first Logical Block Address (LBA) in the first non-volatile memory 210 and the protocol bridge data may be stored away from the storage SOC data, beginning at a second LBA in the first non-volatile memory 210. In this manner, the data storage device 200 need not be provided with a non-volatile memory dedicated to storing protocol bridge data. This saves circuit real estate, lowers costs, power consumption and dissipated heat.

In operation, the data storage device 200 may be configured such that, upon power-on thereof, the storage SOC 206 retrieves its storage SOC code/data from the first non-volatile memory 210 and configures itself according to the retrieved storage SOC code/data. Such configuration may include an initialization of the storage SOC 206, rendering it fully operational for its intended purpose as well as making the bus 208 active, together with protocol bridge 202. Similarly, in operation, the data storage device 200 may be configured such that, upon power-on thereof, the protocol bridge 202 also retrieves its protocol bridge code/data from the first non-volatile memory 210 and configures itself according to the retrieved protocol bridge code/data. Such configuration may include an initialization of the protocol bridge 202, rendering it fully operational for its intended purpose as well as making the bus (e.g., SATA or other protocol) 208 active, together with storage SOC 206.

According to one embodiment and as shown in FIG. 2, the storage SOC 206 may comprise first volatile memory 209. The storage SOC 206 may also comprise second non-volatile memory 207 that may be configured to store storage SOC instructions that, when executed, enable the storage SOC 206 to load the storage SOC code/data from the first non-volatile memory 210 upon power-on. That is, the storage SOC 206 may be configured, upon power on, to retrieve the stored code/data from the second non-volatile memory 207, load them into the first volatile memory 209 and cause their execution. Such code/data, loaded into the first volatile memory 209, are effective to enable the storage SOC 206 to retrieve the storage SOC data from the first non-volatile memory 210 and to configure itself therewith.

According to one embodiment and as shown in FIG. 2, the protocol bridge 202 may comprise second volatile memory 207. The protocol bridge 202 may also comprise third non-volatile memory 205 that may be configured to store protocol bridge instructions that, when executed, enable the protocol bridge 202 to load the protocol bridge code/data from the first non-volatile memory 210 upon power-on, via the bus 208 and via the storage SOC 206. That is, the protocol bridge 202 may be configured, upon power on, to retrieve the stored instructions from the third non-volatile memory 205, load them into the second volatile memory 207 and cause their execution. Such instructions, loaded into the second volatile memory 207, are effective to enable the protocol bridge 202 to request protocol bridge code/data from the storage SOC 206, which may retrieve the requested protocol bridge code/data from the first non-volatile memory 210 and provide the same to the protocol bridge 202 via the bus 208, thereby enabling the protocol bridge 202 to configure itself therewith. The first non-volatile memory 210 may comprise Flash memory and/or non-volatile memory using some other technology.

The first non-volatile memory 210 and the non-volatile memory 242 may be separate and distinct, as suggested in FIG. 2. Alternative, the first non-volatile memory 210 may form part of the non-volatile memory 242; that is, may form part of the primary memory of the data storage device, albeit preferably in a fixed non-user accessible portion thereof. Alternatively still a portion of the first non-volatile memory 210 may itself be user-accessible. According to one embodiment, the protocol bridge 202 may be configured to repeatedly retrieve portions of the protocol bridge code/data from the first non-volatile memory 210 in blocks of a predetermined size. In one implementation, the block size may be 4 KB in size. Other block sizes may be accommodated. Such may be carried out by fetching a first block at some offset (e.g., 0) in the first non-volatile memory 210, validating it (checking for errors, etc.), loading the validated block into the second volatile memory 207, updating the offset and fetching a second block of protocol bridge code/data at the updated offset and so on until all blocks of the protocol bridge code/data have been retrieved from the first non-volatile memory 210, validated and loaded into the second volatile memory 207. Another validation of the complete code/data sequence loaded into the second volatile memory 207 may then be carried out, whereupon the loaded code may be executed to configure the protocol bridge 202.

Figure 3:
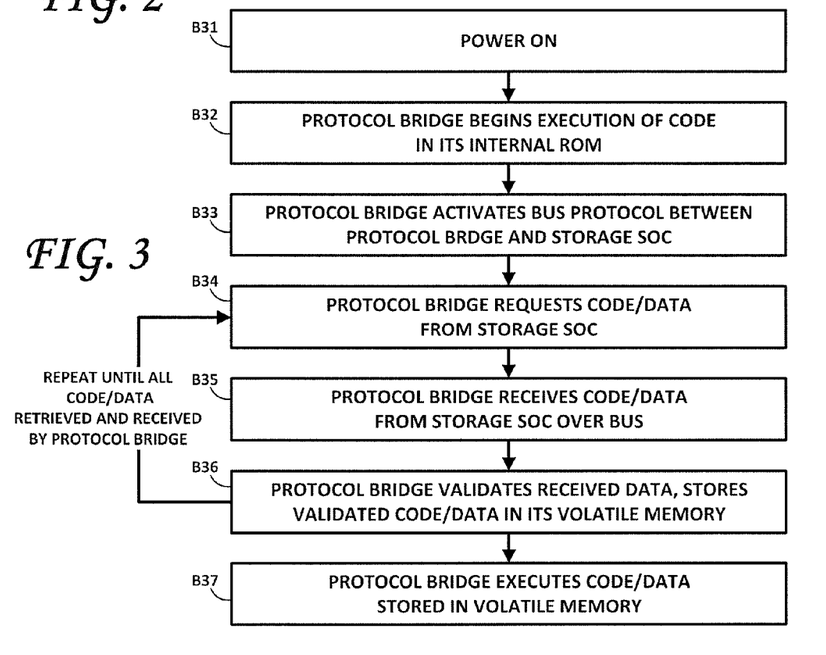
FIG. 3 is a flowchart illustrating aspects of one embodiment.

FIG. 3 is a flowchart that illustrates a method for a protocol bridge to load protocol data (code, instructions, configuration information) according to one embodiment. Block B31 denotes a power-on event, such as when the data storage device is first energized or awaken from a less than fully operational condition. The protocol bridge may then retrieve the code/data stored in its non-volatile memory or read-only memory (ROM), such as third non-volatile memory 205 in FIG. 2. The retrieved code may then be loaded in its volatile memory (e.g., dynamic random access memory (DRAM)), such as shown at 207 in FIG. 2. As shown at B32, the protocol bridge 202 may then execute this code. Simultaneously (for example), the storage SOC 206 may be in the process of retrieving code/data from its second non-volatile memory 207, loading it into its first volatile memory 209. A portion of the protocol code being executed in the protocol bridge 202 and a portion of the storage SOC code being executed in the storage SOC 206 may be effective to activate the bus 208.

With the bus protocol 208 now active, communication between the protocol bridge 202 and the storage SOC 206 and, by extension, with the first non-volatile memory, is now possible. The protocol bridge, as shown at B34, may now request protocol bridge code/data from the storage SOC 206. The storage SOC 206 may then retrieve the requested protocol bridge code/data from the first non-volatile memory 210 and send it to the protocol bridge 202, where it is received, as shown at B35 in FIG. 3. The received protocol bridge code/data may now be validated (e.g., checked for errors) and the validated protocol bridge code/data may be stored in the second volatile memory 207 of the protocol bridge 202, as shown at B36. The protocol bridge code/data or portions thereof, may be iteratively requested by the protocol bridge 202, sent by the storage SOC 206 and received and validated by the protocol bridge 202 and until all of the protocol bridge code/data previously stored in the first non-volatile memory 210 has been stored in the second volatile memory 207. As noted above, the portions or blocks of protocol bridge code/data iteratively received from the storage SOC 206 data may be, for example, 4 KB in size, although other sizes (16 KB, 32 KB or other) may be used as well. This iteration is shown in FIG. 3 as the repeated blocks B34, B35 and B36. Although not shown, once all of the protocol bridge code/data has been stored in the second volatile memory 207, one or more additional validation operations may be carried out, to ensure the protocol bridge code/data has been received without errors. Lastly, as shown at B37, the protocol bridge's controller may then execute the code contained in the loaded protocol bridge code/data to configure the protocol bridge 202 to its intended operational state.

Manufacturers of data storage devices are confronted with the seemingly opposed goals of increasing storage capacity and functionality and decreasing costs. These competing goals have led such manufacturers to use low cost microprocessors that operate on limited-width words and that are capable of addressing only a limited code space. For example, the controller in a protocol bridge may be configured as a 16-bit controller whose addressing space may span only about 64,000 discrete physical addresses. The totality of the code used by the protocol bridge may, however, not fit within the controller's address space, especially in infrequent and transient situations, such as the receipt of selected commands from a host. To access the required functionality in such infrequent and transient situations, so-called overlay code may be retrieved from the first non-volatile memory 210 and sent by the storage SOC 206 to the protocol bridge 202 for loading into its second volatile memory 207 for execution. The code previously stored therein may be erased or the overlay code may overwrite the protocol bridge code previously stored in the second volatile memory 207. The protocol bridge 202 may then execute the overlay protocol bridge code to address the infrequent and/or transient situation, whereupon the overlay code may be erased or overwritten by the protocol bridge code/data previously stored in the second volatile memory 207 that it had replaced.

Figure 4:
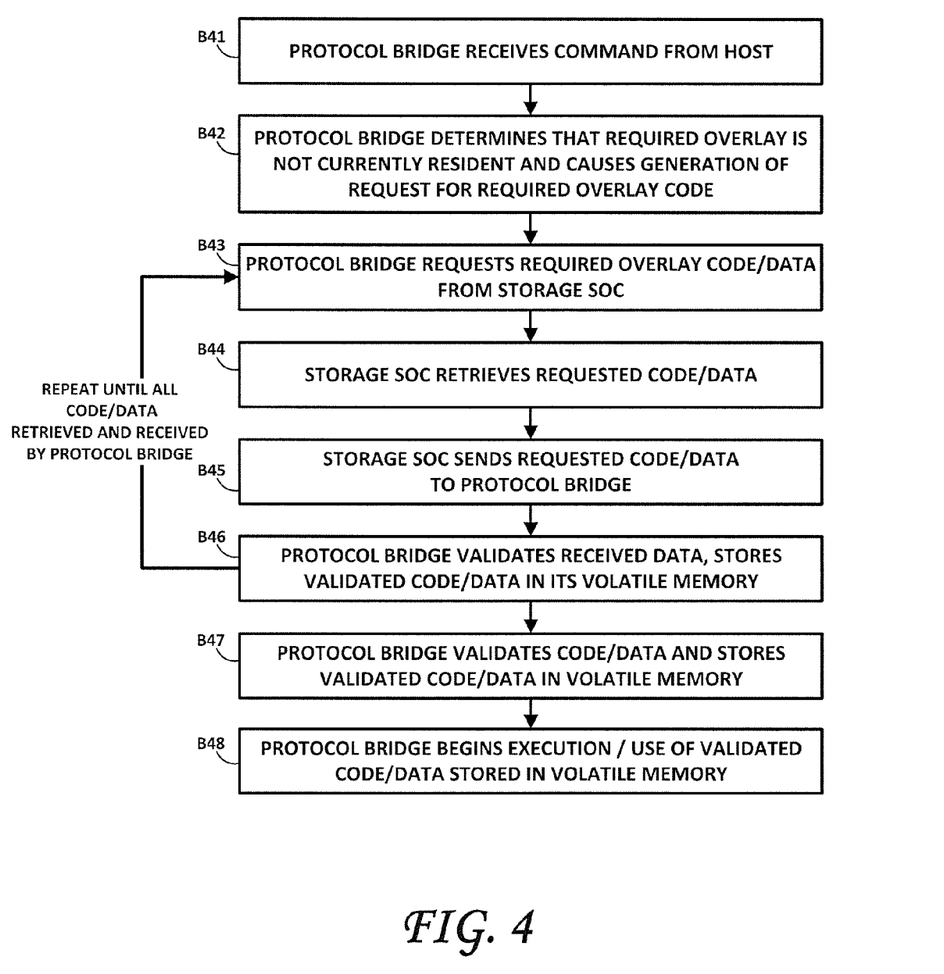
FIG. 4 is a flowchart illustrating aspects of one embodiment.

FIG. 4 is a flowchart illustrating a method of loading overlay code in a protocol bridge of a data storage device according to one embodiment. As shown therein, block B41 calls for the protocol bridge 202 to receive a command from the host 204. At B42, the protocol bridge determines that execution of the received command necessitate the execution of overlay code/data not currently resident in the second volatile memory 207 and causes the generation of a request for (at least a portion of) the required overlay code from first non-volatile memory 210 via the storage SOC 206. Block B43 calls for the protocol bridge to request the required overlay code/data from the storage SOC 206, through the sending of the generated request thereto. In B44, the storage SOC 206 retrieves the requested overlay code/data from the first non-volatile memory 210 and sends it to the protocol bridge 202, as shown at B45. As shown in B46, the protocol bridge may then validate the received protocol bridge overlay code/data and store it in the second volatile memory 207. The overlay code/data may be requested, sent and received iteratively, block by block until all overlay code/data has been received by the protocol bridge 202 by repeating blocks B43, B44, B45 and B46 until all blocks of the overlay code/data have been received and stored. At B47, the protocol bridge 202 may validate the overlay code/data, whereupon the protocol bridge 202 may begin execution of the validated overlay code/data, to carry out the command received from the host 204. When the overlay code/data is no longer needed, it may be replaced by other protocol bridge code/data in the manner described previously.

Figure 5:
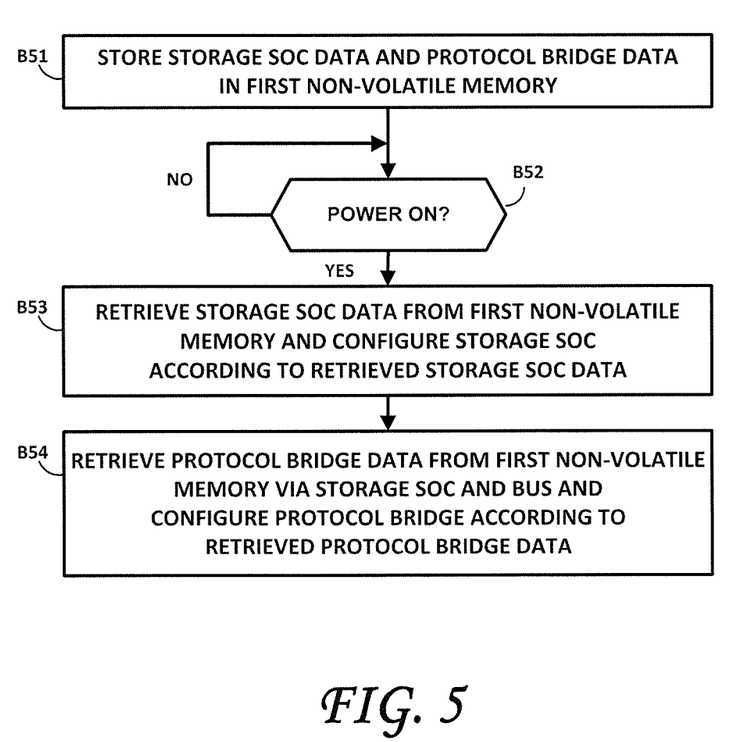
FIG. 5 is a flowchart of a method according to another embodiment.

FIG. 5 is a flowchart of a method according to one embodiment. As shown in block B51, storage SOC data (e.g., storage SOC code, storage SOC configuration data and other storage SOC data) and protocol bridge data (e.g., protocol bridge code, protocol bridge configuration data and other protocol bridge data) may be stored in the first non-volatile memory, as shown at 210 in FIG. 2. At block B52, it may be determined whether a power-on of the data storage device has occurred. Essentially, nothing happens until the power is turned on (NO branch of B52). When the power is turned on (YES branch of B52), block B53 calls for retrieving the storage SOC code/data from the first non-volatile memory 210 (comprising SPI Flash memory, for example) and configuring the storage SOC 206 according to the retrieved storage SOC code/data. To carry this out upon power-on, code/data may be retrieved from the second non-volatile memory 207 and stored in the first volatile memory 209 for execution.

Upon power-on the protocol bridge 202 may have similarly retrieved code/data from its internal third non-volatile memory 205 and stored in the second volatile memory 207 for execution. The code/data stored in the first volatile memory 209 and the second volatile memory 207 may also be effective to enable the bus protocol 208, to enable bi-directional communication between the protocol bridge 202 and the storage SOC 206. Then, as shown at B54, the protocol bridge 202 may retrieve bridge protocol code/data from the first non-volatile memory 210, via the storage SOC 206 and the bus 208. The protocol bridge 202 may then be configured according to the retrieved protocol bridge code/data, to render the protocol bridge 202 to its fully operational state.

According to one embodiment, the protocol bridge code/data may be stored in the first non-volatile memory 210. However, the protocol bridge code/data need not be stored therein. Indeed, the protocol data/code may be stored in the rotating media 237. However, storing the protocol bridge code/data in the rotating media may cause an unacceptably long delay upon power-on as the platters containing the recording media spin up to their nominal operating speed. Storing at least a portion of the protocol bridge code/data in the solid state memory 242 avoids such latency and spin-up issues. Indeed, the command used to retrieve this protocol bridge code/data ideally would not cause a spin-up of the HDD's platters, for both completion time and power consumption considerations. The command to retrieve the execution image may be a log page command that maps to the first non-volatile memory 210.

Implementation of an embodiment may reduce the Bill of Materials (BOM) cost by eliminating the need for a non-volatile memory dedicated to the protocol bridge 202. Storing both the storage SOC and the protocol bridge code/data in a same non-volatile memory may require a comparatively larger-size first non-volatile memory 210. However, such a larger non-volatile memory 210 is likely less costly than providing a dedicated first non-volatile memory to store the storage SOC code/data and a dedicated second non-volatile memory to store the protocol bridge code/data. Moreover, providing one non-volatile memory 210 for both the protocol bridge code/data and the storage SOC code/data also reduces space requirements, power consumption and heat dissipation and associated structures.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A data storage device, comprising:
   a first non-volatile memory, configured to store a second portion of storage System-On-Chip (SOC) instructions and data and a second portion of protocol bridge instructions and data;
   a storage SOC configured to control the data storage device and comprising second non-volatile memory configured to store a first portion of SOC instructions and data, the storage SOC comprising circuitry configured to execute the first portion of SOC instructions and data upon power-on and to enable the storage SOC to retrieve the second portion of storage SOC instructions and data from the first non-volatile memory and configure itself according to at least the retrieved second portion of storage SOC instructions and data;
   a bus coupled to the storage SOC; and
   a protocol bridge coupled to the bus and comprising:
      circuitry configured to translate between a first and a second communication protocol; and
      third non-volatile memory configured to store a first portion of protocol bridge instructions and data that, when retrieved and executed, enables the protocol bridge to activate the bus upon power-on, and enables the protocol bridge to retrieve the second portion of protocol bridge instructions and data from the first non-volatile memory via the storage SOC and the activated bus and configure itself according to at least the retrieved second portion of protocol bridge instructions and data.

2. The data storage device of claim 1, further comprising first volatile memory and wherein the storage SOC is further configured to load at least the second portion of storage SOC instructions and data retrieved from the first non-volatile memory into the first volatile memory.

3. The data storage device of claim 2, wherein the circuitry in the protocol bridge further comprises second volatile memory and wherein the first non-volatile memory is further configured to store overlay protocol bridge instructions and data and wherein the circuitry in the protocol bridge is further configured to, after having configured itself, retrieve the overlay protocol bridge instructions and data from the first non-volatile memory via the storage SOC and the activated bus and to store the retrieved overlay protocol bridge instructions and data in the second volatile memory.

4. The data storage device of claim 1, wherein the circuitry in the protocol bridge further comprises second volatile memory and wherein the protocol bridge is further configured to load at least the second portion of protocol bridge instructions and data retrieved, via the storage SOC and the activated bus, from the first non-volatile memory into the second volatile memory.

5. The data storage device of claim 1, wherein a portion of the first non-volatile memory is configured as user-accessible memory.

6. The data storage device of claim 1, further comprising primary non-volatile storage memory that is separate from the first non-volatile memory, at least a portion of the primary non-volatile storage memory being user-accessible.

7. The data storage device of claim 1, wherein the circuitry in the protocol bridge is configured to repeatedly retrieve parts of the second portion of protocol bridge instructions and data from the first non-volatile memory in blocks of a predetermined size.

8. A method of configuring and operating a data storage device comprising first non-volatile memory, a storage System-On-Chip (SOC) coupled to the first non-volatile, memory and comprising a second non-volatile memory, a bus coupled to the storage SOC and a protocol bridge coupled to the bus, the protocol bridge comprising a third non-volatile memory and being configured to translate between a first and a second communication protocol, the method comprising:
   storing a first portion of storage SOC instructions and data in the second non-volatile memory and storing a first portion of protocol bridge instructions and data in the third non-volatile memory;
   storing a second portion of storage SOC instructions and data and a second portion of protocol bridge instructions and data in the first non-volatile memory; and
   upon power-on of the data storage device:
      retrieving the first portion of storage SOC instructions and data from the second non-volatile memory, the retrieved first portion of storage SOC instructions and data enabling the storage SOC to retrieve the second portion of SOC instructions and data from the first non-volatile memory and to configure the storage SOC according to the retrieved first and second portions of storage SOC instructions and data; and
      retrieving the first portion of protocol bridge instructions data from the third non-volatile memory, activating the bus using the first portion of protocol bridge instructions and data retrieved from the third non-volatile memory and retrieving the second portion of protocol bridge instructions and data from the first non-volatile memory via the storage SOC and the activated bus and configuring the protocol bridge according to the retrieved first and second portions of the protocol bridge instructions and data.

9. The method of claim 8, wherein the storage SOC further comprises first volatile memory and wherein the method further comprises loading at least the second portion of storage SOC instructions and data retrieved from the first non-volatile memory into the first volatile memory.

10. The method of claim 9, wherein the protocol bridge further comprises second volatile memory and the method further comprises, after the protocol bridge has configured itself, retrieving overlay protocol bridge instructions and data from the first non-volatile memory via the storage SOC and the activated bus and storing the retrieved overlay protocol bridge instructions and data in the second volatile memory.

11. The method of claim 8, wherein the protocol bridge further comprises second volatile memory and wherein the method further comprises loading at least the second portion of protocol bridge instructions and data retrieved, via the storage SOC and the activated bus, from the first non-volatile memory into the second volatile memory.

12. The method of claim 8, wherein a portion of the first non-volatile memory is configured as user-accessible memory.

13. The method of claim 8, performed with the data storage device further comprising primary non-volatile storage memory that is separate from the first non-volatile memory, at least a portion of the primary non-volatile storage memory being user-accessible.

14. The method of claim 8, further comprising the protocol bridge repeatedly retrieving parts of the second portion of protocol bridge instructions and data from the first non-volatile memory in blocks of a predetermined size.

15. Circuitry for a data storage device, comprising:
- a first non-volatile memory, configured to store a second portion of storage System-On-Chip (SOC) instructions and data and a second portion of protocol bridge instructions and data;
- a storage SOC configured to control the data storage device and comprising second non-volatile memory configured to store a first portion of SOC instructions and data, the storage SOC comprising circuitry configured to execute the first portion of SOC instructions and data upon power-on and to enable the storage SOC to retrieve the second portion of storage SOC instructions and data from the first non-volatile memory and configure itself according to at least the retrieved second portion of storage SOC instructions and data;
- a bus coupled to the storage SOC; and
- a protocol bridge coupled to the bus and comprising:
    - circuitry configured to translate between a first and a second communication protocol; and
    - third non-volatile memory configured to store a first portion of protocol bridge instructions and data that, when retrieved and executed, enables the protocol bridge to activate the bus upon power-on, and enables the protocol bridge to retrieve the second portion of protocol bridge instructions and data from the first non-volatile memory via the storage SOC and the activated bus and configure itself according to at least the retrieved second portion of protocol bridge instructions and data.

* * * * *